US005555969A

United States Patent [19]

Yerly

[11] Patent Number: 5,555,969

[45] Date of Patent: Sep. 17, 1996

[54] DEVICE FOR FASTENING A GRIPPER BAR ON A CHAIN TRAIN IN A MACHINE THAT PROCESSES PLATE-LIKE WORKPIECES

[75] Inventor: Marcel Yerly, Jouxtens, Switzerland

[73] Assignee: Bobst SA, Lausanne, Switzerland

[21] Appl. No.: 432,639

[22] Filed: May 3, 1995

[30] Foreign Application Priority Data

May 4, 1994 [CH] Switzerland .......................... 01396/94

[51] Int. Cl.[6] .................................................... B65G 17/38

[52] U.S. Cl. .................. 198/803.3; 198/817; 198/470.1; 271/204

[58] Field of Search ............................ 198/803.3, 803.8, 198/817, 848, 850, 681, 470.1; 271/204, 205, 206, 82, 85

[56] References Cited

U.S. PATENT DOCUMENTS

| | | | |
|---|---|---|---|
| 3,826,486 | 7/1974 | Abendroth | 271/204 |
| 4,635,788 | 1/1987 | McDonald | 198/848 |
| 5,125,640 | 6/1992 | Yerly et al. | 271/204 |
| 5,145,055 | 9/1992 | Kondo | 198/817 X |
| 5,201,516 | 4/1993 | Cherian et al. | 271/204 X |

FOREIGN PATENT DOCUMENTS

| | | |
|---|---|---|
| 0448943 | 10/1991 | European Pat. Off. . |
| 2520231 | 11/1976 | Germany . |
| 3502663 | 6/1986 | Germany . |
| 895640 | 5/1962 | United Kingdom . |

*Primary Examiner*—James R. Bidwell
*Attorney, Agent, or Firm*—Hill, Steadman & Simpson

[57] ABSTRACT

A device for fastening a gripper bar to a driving chain includes a first part which is an integral part of the chain of which it is to replace one of the links, this first part consisting of vertical outer plate portions and vertical inner plate portions linked by an inner connection and able to receive between them the upstream axle and the downstream axle of the chain link. The device also includes a horizontal plate portion extending from the inner vertical plate portion for engaging an upper surface of an upper wall of the bar while a counter-plate is inserted in the profiled piece of the bar end so that the upper wall of the profiled piece of the bar is disposed between the counter-plate and the horizontal plate portion and these members are interconnected by threaded fasteners.

8 Claims, 3 Drawing Sheets

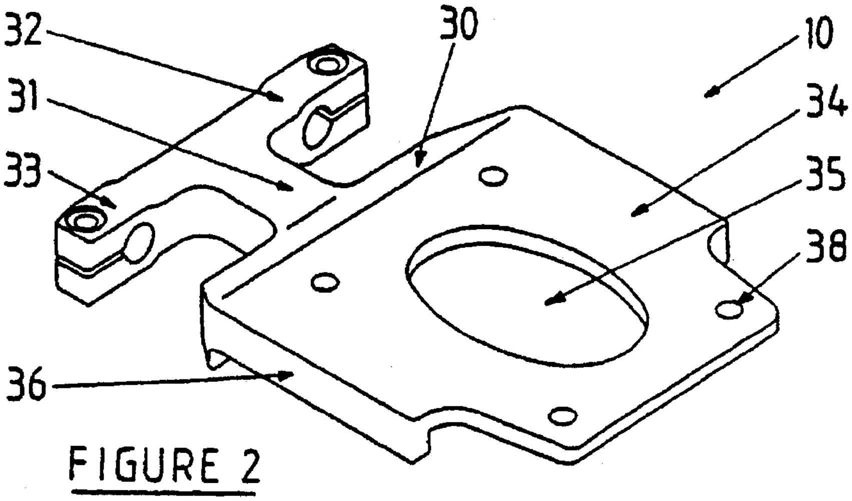
FIGURE 2
FIGURE 3
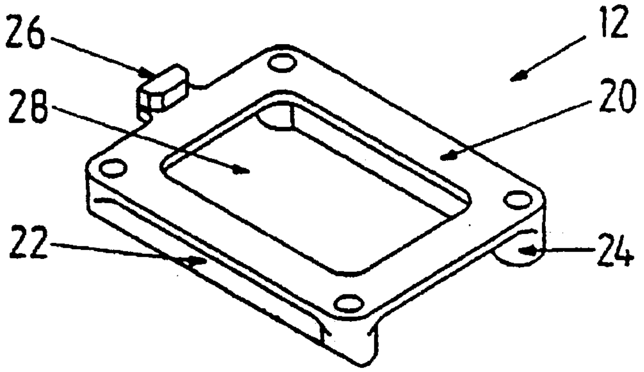
FIGURE 4
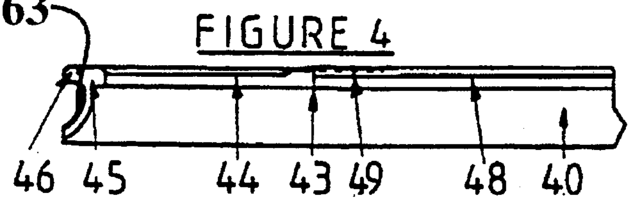
FIGURE 5
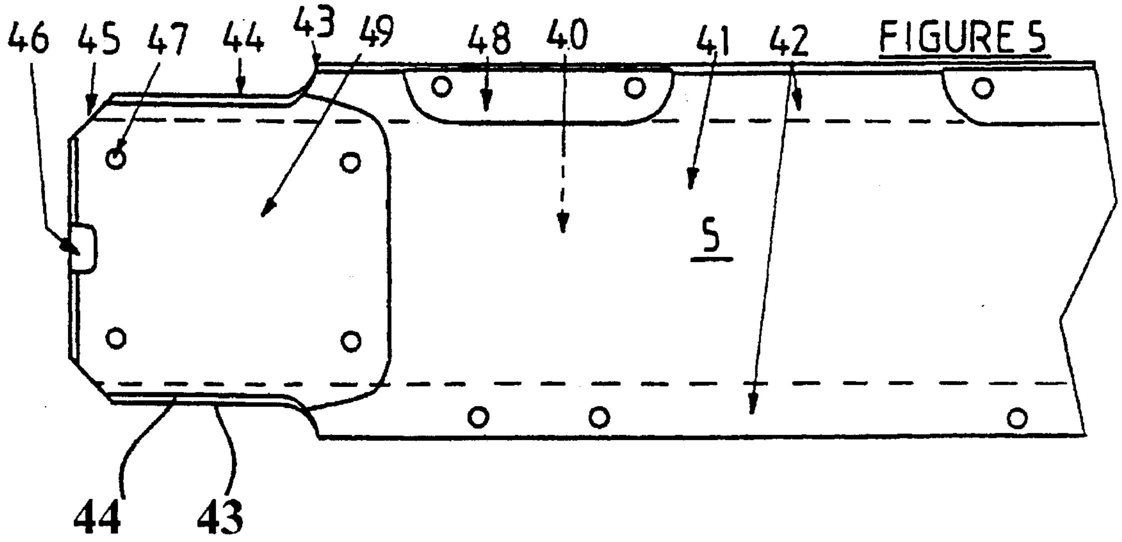

DEVICE FOR FASTENING A GRIPPER BAR ON A CHAIN TRAIN IN A MACHINE THAT PROCESSES PLATE-LIKE WORKPIECES

BACKGROUND OF THE INVENTION

The present invention is directed to a device for fastening a gripper bar onto a continuous chain train in a machine that processes plate-like workpieces, such as sheets of paperboard or cardboard, as well as to the gripper bar specifically adapted to this device.

A machine for processing paperboard or cardboard usually includes an infeed station in which a pile of sheets is arranged, with every sheet being successively taken from the top of the pile in order to be carried onto a feeding table. On the table, every sheet is positioned against front lays and side-marks before a front edge of the sheet is seized by a series of grippers mounted along a crosswise bar, whose ends are fastened onto a train of lateral continuous chains, which carry the bar and also the sheet into the next processing station sequentially. These processing stations can include a die-cutting press, which is then followed by a waste stripping station. These processing stations are followed by a delivery station in which each sheet is released by the grippers and is aligned prior to being dropped onto a top of an outlet pile of processed sheets.

The device for fastening the gripper bars onto the two trains of lateral chains, which form a continuous loop extending between a driving chain wheel and a driven chain wheel, has to be very solid in order to transmit to the bars and, hence, to the sheets the acceleration and deceleration forces which appear in the course of the intermittent run at high speed throughout the successive stations.

This fastening device also must remain rigid to rotation around an axle which is passed by the chain train in order to limit, as much as possible, the flexing or bending of the bar due to the centrifugal forces occurring during the movement of the chain, particularly when passing around the driving and driven chain wheels, which are arranged on the path of the chain.

In addition, the crossbars which support the grippers are usually made out of hollow profiled pieces in order to remain rigid to flexing and to have minimum weight and, hence, a minimum inertia.

A known fastening device includes a monobloc piece comprising a first part which is an integral part of the chain in which the part replaces one of the links and a second part which lengthens the inner face of the first part and is inserted in the profiled piece of the bar where it is mounted, for instance, with bolts. The length of this monobloc piece, in the direction of the bar, makes it remain rigid to centrifugal forces.

However, the conception of this known fastening device, which comprises a part inserted in the profiled piece, makes it impossible to dismantle the gripper bar for fixing or replacing without having to open the chain train. The opening of the chain train is a particularly difficult and fastidious operation.

In addition, the fastening device is different depending whether it is designed for the left-hand side chain, which is the operator's side, or for the right-hand side chain, which is opposite to the operator, due to the existence of a notch or other orifice for the setting of the first gripper. This fact compels the maintenance of double stocks of spare parts that are symmetrical between them.

SUMMARY OF THE INVENTION

The object of the present invention is to provide a device for fastening a bar onto two trains of lateral continuous chains, which device is able to respect the characteristics of solidity and the control of the centrifugal forces. The device has a simple construction and is identical on either side so as to reduce, at the same time, the production costs and the necessity of maintaining different parts. Moreover, such a device is associated with gripper bars made out of and adapted to profiled pieces, which bars may be dismantled without opening the chain train.

To accomplish these goals, the present invention is directed to a device which includes a first part or piece, a counter-plate to be inserted in the profiled piece of the bar end and fastening means for crossing a wall of the bar entrapped between the first part and the counter-plate. The first part or piece has a first portion that is an integral part of the chain and replaces one of the links and the first portion includes a vertical outer plate portion and a vertical inner plate portion linked by an inner connection. The two plate portions are able to receive between them the upstream axle and the downstream axle of the chain link, with each axle eventually being covered by a telescopically received cylinder or sleeve. The first part also includes a second portion, which lengthens the inner face of the first part and consists of a horizontal plate portion to be installed on one of the faces of the bar end. The second portion coacts with the counter-plate, which is inserted in the profiled piece of the bar end and is fastened to the second portion by fastening means, such as bolts.

The dismantling of a damaged or worn gripper bar consists in separating the horizontal plate portion from the counter-plate, which action liberates the end of the bar. It is then unnecessary to act on the first portion of the first part of the fastening device and, hence, to open the chain train.

In a preferred embodiment, the horizontal plate portion of the second portion is linked to the upper edge of the vertical inner plate portion of the first portion, if necessary, by means of a connection slanting upward in such a way that the first portion is levelled with the gripper bar.

In a preferred embodiment, the fastening device is symmetrical about the vertical plane crossing the gripper bar, the inner and outer plate portions and with the central connection between the plate portions. Owing to this geometry, an identical fastening device can be used on the operator's side as much as on the side opposite the operator.

Advantageously, the upper wall of the gripper bar end has an area which is thicker one way than the other portions to form a seat for the horizontal plate portion of the fastening device.

Advantageously, the outer edge of the end of the upper wall of the bar has a central notch which is to house a positioning lug or projection of the counter-plate. This lug and this notch facilitate the positioning of the counter-plate in the profiled piece of the bar with regard to the upper face and wall which has an area which is thicker one way than the other. The link of the upper plate portion and of its counter-plate is then immediate.

When the profiled piece or upper wall of the bar has a plane upper surface completed with a border on the front and upstream edges, this border is reduced up to the end that has an area which is thicker one way than the other to form a cut-away border and the horizontal plate portion of the fastening device has two lateral flanges surrounding the bar along this reduced or cut-away border. The crosswise hold of the bar by the fastening device is, hence, reinforced and the positioning of the horizontal plate portion on the face of the profiled piece is accordingly facilitated.

Advantageously, the counter-plate is almost rectangular and perforated and the fastening means of the horizontal plate portion and of the counter-plate consist of two pairs of bolts crossing the plate portion and the wall of the bar before being inserted in tapped orifices bored in overthickened bosses, which serve as nuts and which are arranged at the four corners of the counter-plate. The upper plate can also be perforated in its center in order to have its weight reduced accordingly.

Other advantages and features of the invention will be readily apparent from the following description of the preferred embodiments, the drawings and claims.

BRIEF DESCRIPTION OF THE DRAWINGS

FIG. 2 is a perspective view of a first piece of the fastening device according to the invention;

FIG. 3 is a perspective view of a second piece of the fastening device according to the present invention;

FIG. 4 is a partial side view of an end of the bar designed for receiving the fastening device according to the present invention;

FIG. 5 is a top plan view of the end of the bar of FIG. 4;

DESCRIPTION OF THE PREFERRED EMBODIMENTS

The principles of the present invention are particularly useful when incorporated in a fastening device 10 which is inserted in a drive chain and supports a bar 5 extending between the pair of chains. The bar 5 carries a plurality of parallel grippers 6. The fastening device comprises upstream and downstream seats for the axles of chain links 2.

Figure 1:
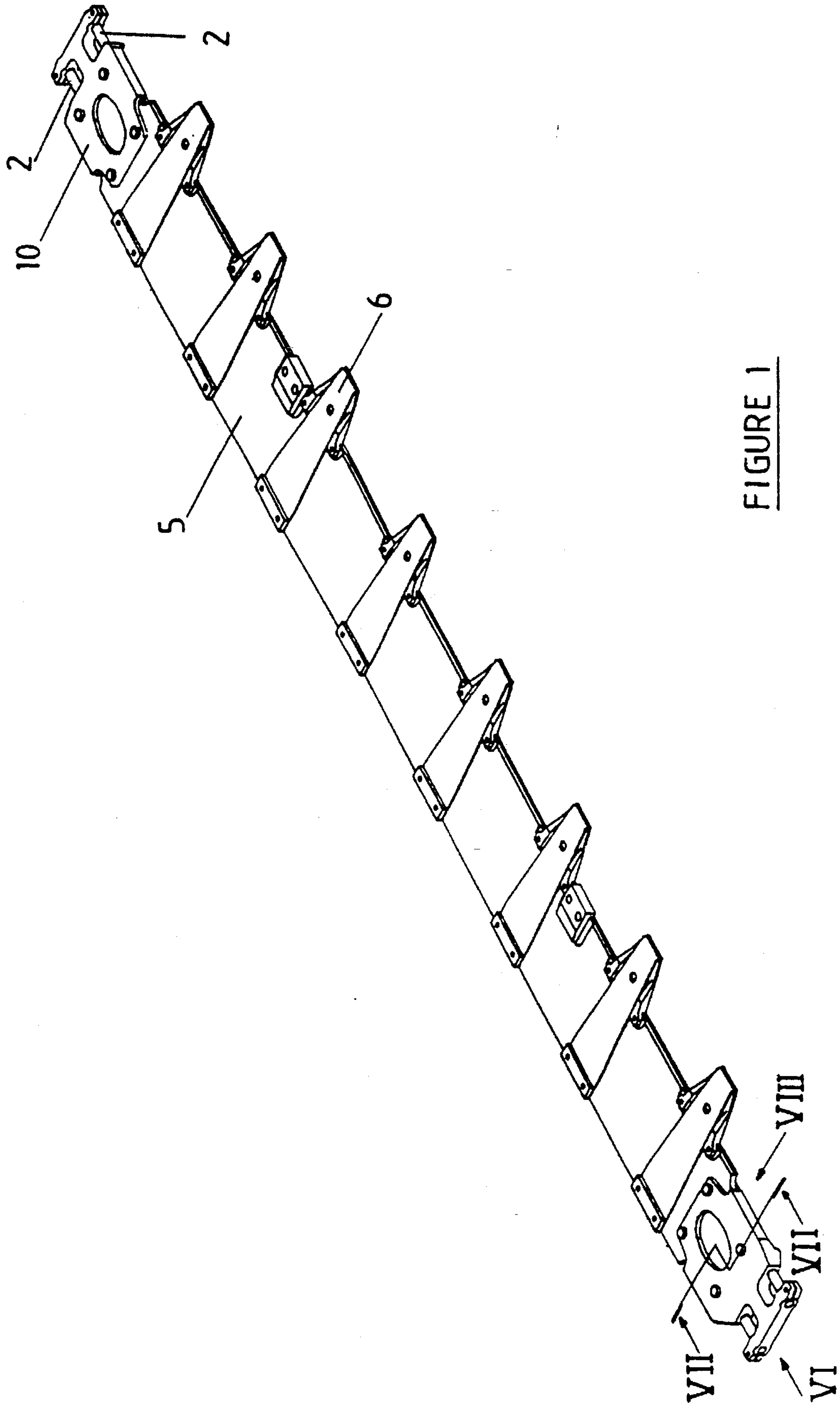
FIG. 1 is a perspective view of a bar linked on each end by two fastening devices according to the present invention.
Figure 6:
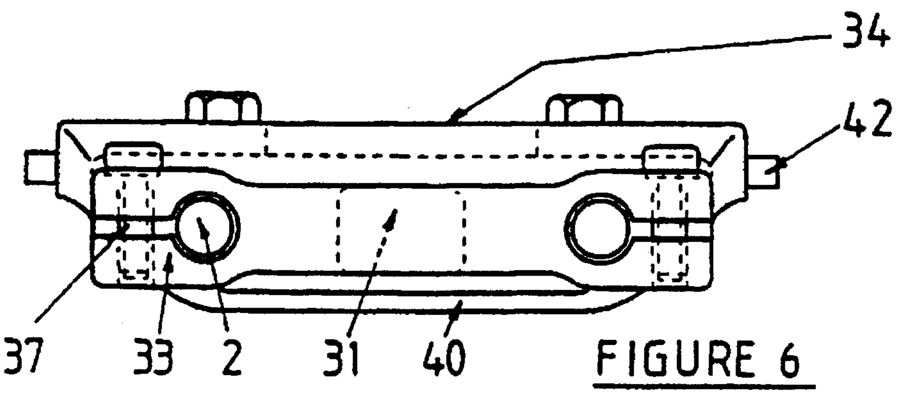
FIG. 6 is an end view taken in the direction of arrow VI of FIG. 1.

More specifically, the fastening devices, best illustrated in FIGS. 2 and 3, include a first piece of FIG. 2 and a counter or second piece shown in FIG. 3. The first piece (FIG. 2) has two vertical plate portions with an inner plate portion 30 and an outer plate portion 32 which extend parallel and are separated from one another by a central connection 31. These two vertical plate portions receive axles 2 of the chain links, and these axles are held and gripped in the outer plate portion 32 by gripping sections 33, which can be tightened by bolts 37 (as illustrated in FIG. 6) to clamp on the axles 2.

The upper edge of the vertical inner plate portion 30 is extended by a horizontal upper plate portion 34, which is almost rectangular and has an oval perforation 35 in its center. In the four corners of this plate portion 34, vertical cylindrical orifices 38 are provided or bored. In addition, three-quarters of each of the lateral edges of the plate portion 34 are completed with a vertical flange 36.

As illustrated in FIG. 3, the counter-plate or piece 12 has a shape of a horizontal rectangle 20, which also is with a rectangular center perforation 28. Underneath the four corners of the rectangle 20 are arranged thick bosses 24, which have vertically tapped orifices which serve as nuts. For a better rigidity of the counter-plate or portion 12, the bosses 24, which are arranged on the same lateral edge, are linked by means of a rigid rib 22. The upper edge of the sides of the rectangle 20 directed toward the vertical plate 30 is completed by a vertically extending central projection or lug 26.

The gripper bar 5, as illustrated in FIGS. 4 and 5, is to be used with the above-described fastening device and consists of a profiled piece 40 (best illustrated in FIG. 7), which has an almost oval cross section with a planar bottom wall 60, curved sidewalls 61 and an upper planar or flat wall 62, which has a flat planar upper surface 41. The flat wall, on both an upstream and downstream edge, has two borders 42 which extend the length of the bar for a better fastening of the grippers. For instance, the downstream border has a pair of orifices for the fastening of the upper finger of the gripper 6 on the gripper bar, whereas the corresponding orifices for fastening the lower finger of a gripper 6 are achieved within pre-positioned seats 48 (FIG. 5) arranged on the upstream border 42.

Figure 7:
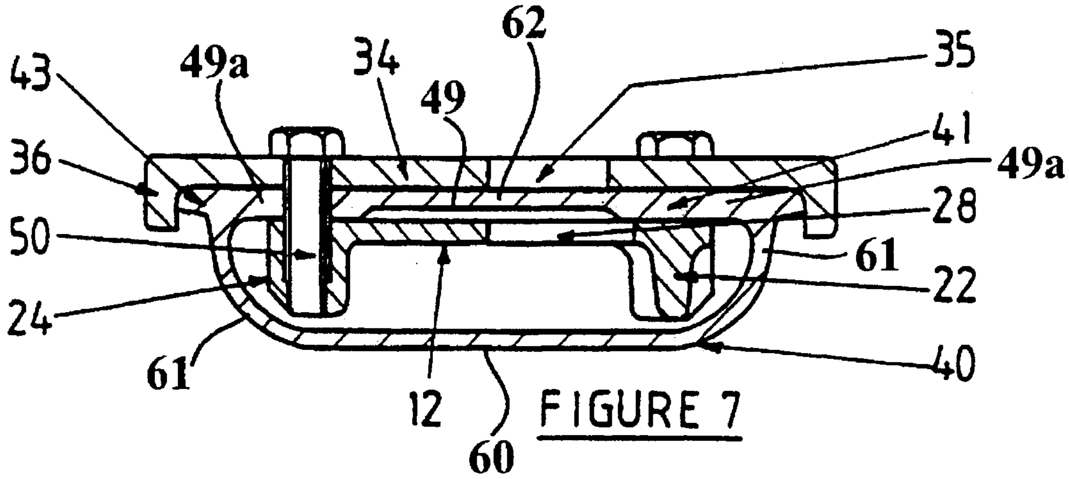
FIG. 7 is a cross sectional view with portions in elevation for purposes of illustration taken along the line VII—VII of FIG. 1.

More specifically, the upper wall 62 at an end of this bar has an area 49*a* on each side which is thicker than the other area 49, as best illustrated in FIG. 7. These thicker portions 49*a* and the thinner portion 49 form a seat for a horizontal upper plate portion 34 of the fastening device 10. In the areas 49*a*, which are thicker, four vertical orifices 47 are formed or bored in correspondence with the orifices 38 of the plate 34. Moreover, the two borders 42 are reduced by one-half, if not by two-thirds, to form a restriction or cut-away portion 43 having a chamfer 44 at an upper edge, as illustrated in FIGS. 4 and 5. Each of the outer corners of the bar 5 are bevelled at 45, which bevel cuts off an outer edge 63 of each of the sidewalls 61 of the bar and does not permit the existence of any noxious acute angles. Finally, an aligning notch 46 is cut in the middle of the farthest edge of the upper wall 62 of the bar 5.

As more visible in FIGS. 6–8, the gripper bar 5 is fitted to the fastening device 10 in the following way. The counter-plate 12 is, first of all, inserted into the profiled piece 40 of the bar 5 until its lug 26 is installed in a notch 46 existing in the middle of the farthest edge of the upper wall 62. Thus positioned, the nuts formed in the bosses 24 of the counter-plate 12 are in accurate correspondence with the through-orifices 47 of the thickened area 49*a*. The upper plate portion 34 is then brought above the upper surface 41 of the bar 5, the lateral positioning being ensured by the flanges 36 of the horizontal plate portion which will be applied on top of the cut-outs or restrictions 43 of the borders 42. The upper plate portion 34 needs only to be set forward or backward until the orifices 38 of the horizontal plate portion are in correspondence with the orifices 47 of the bar and the bores in the bosses 24 of the counter-plate 12. Bolts 50 can then be engaged and threaded into the nuts formed in the bosses 24. The tightening of these four bolts takes the upper face 41 of the bar 5 as the wall 62 is sandwiched between the horizontal plate portion 34 and the counter-plate 12.

Figure 8:
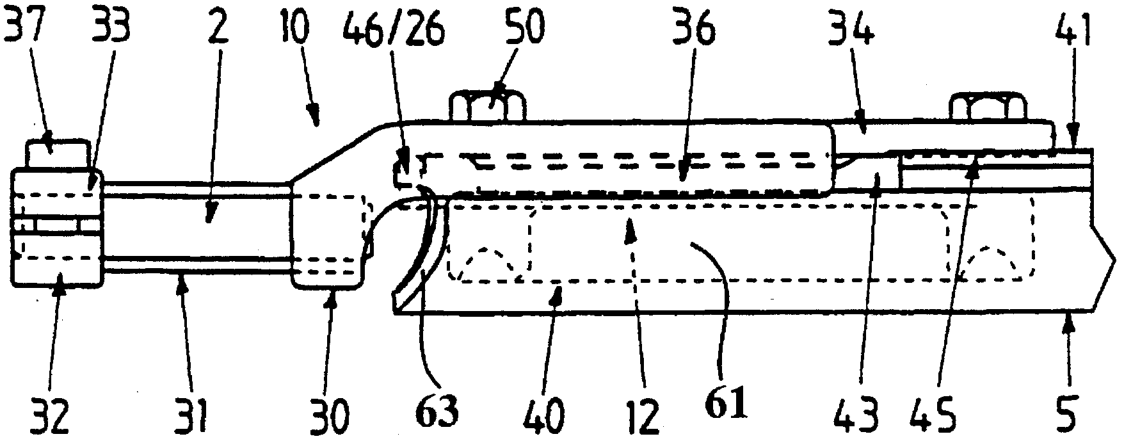
FIG. 8 is an enlarged side view taken in the direction of arrow VIII of FIG. 1.

As best illustrated in FIG. 8, the connection between the upper portion 34 and the vertical plate portion 30 is slightly slanted and the profiled piece 40 is leveled with the axles 2 of the chain links.

The fact that just the four bolts 50 are to be unscrewed in order to exchange a damaged or worn bar should be appreciated. This action will immediately liberate the gripping bar 5 without the necessity of touching the axles 2 of the chain links.

Although various minor modifications may be suggested by those versed in the art, it should be understood that I wish to embody within the scope of the patent granted hereon all such modifications as reasonably and properly come within the scope of my contribution to the art.

I claim:

1. A device for fastening a gripper bar to a driving chain, said device having a first piece which has a first portion which forms an integral part of the chain in which it replaces a link, said first portion consisting of a vertical outer plate portion and a vertical inner plate portion linked by an inner connection and able to receive between them an upstream axle and downstream axle of the chain link, with each axle being eventually covered by a gearing cylinder, a horizontal plate portion for engaging on an upper surface of the end of the bar extending from the vertical inner plate portion and a counter-plate being inserted in the profiled piece of the bar and connected to the upper horizontal plate portion by fastening means extending through portions of an upper wall of the bar entrapped therebetween.

2. A device according to claim 1, wherein the horizontal plate portion is linked to the upper edge of the vertical plate portion of the first part by means of a connection slanting upwardly in such a way that the vertical portions of the first piece which receive axles of the chain link are level with the gripper bar.

3. A device according to claim 2, wherein the device is symmetrical about the vertical plane crossing the gripper bar, the inner connection of the inner and outer vertical plate portions being on said vertical plane.

4. A device according to claim 2, wherein the upper wall of the gripper bar having an upper surface with two portions thicker than the remaining portions, said two portions forming seats for the horizontal plate portion of the fastening device.

5. A device according to claim 4, wherein an edge of the outer end of the upper wall of the bar has a central notch which is housed to receive a corresponding positioning lug on the counter-plate.

6. A device according to claim 4, wherein the upper wall of the bar has a plane for the upper surface completed with a border on each side on the upstream edge and that the border is cut-away in the area which is thicker than the other area to form reduced border portions and the horizontal plate portion of the fastening device is provided with two lateral flanges surrounding the upper wall of the bar along its reduced border portions.

7. A device according to claim 4, wherein the counter-plate is almost rectangular and perforated, the fastening means of the horizontal plate portion and the counter-plate consist of two pairs of bolts crossing the horizontal plate portion, the upper wall before being inserted in tapped orifices bored in thickened bosses provided at each of the four corners of the counter-plate.

8. A device according to claim 1, wherein the fastening device is symmetrical around a vertical plane crossing the gripping bar, the inner and outer vertical plate portions of the first part, and the inner connection.

* * * * *